(12) United States Patent
Han et al.

(10) Patent No.: US 9,706,506 B2
(45) Date of Patent: Jul. 11, 2017

(54) METHOD AND APPARATUS FOR CONTROLLING TRANSMITTING POWER

(71) Applicant: HUAWEI TECHNOLOGIES CO., LTD., Shenzhen, Guangdong (CN)

(72) Inventors: Guanglin Han, Beijing (CN); Shulan Feng, Beijing (CN); Jing Han, Beijing (CN); Yuhua Chen, Shenzhen (CN); Yi Guo, Shanghai (CN); Jian Zhang, Beijing (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 186 days.

(21) Appl. No.: 14/044,127

(22) Filed: Oct. 2, 2013

(65) Prior Publication Data

US 2014/0036827 A1 Feb. 6, 2014

Related U.S. Application Data

(63) Continuation of application No. PCT/CN2012/072809, filed on Mar. 22, 2012.

(30) Foreign Application Priority Data

Apr. 2, 2011 (CN) .......................... 2011 1 0083553

(51) Int. Cl.
*H04W 52/00* (2009.01)
*H04W 52/36* (2009.01)
(Continued)

(52) U.S. Cl.
CPC ......... *H04W 52/365* (2013.01); *H04W 52/16* (2013.01); *H04W 52/243* (2013.01);
(Continued)

(58) Field of Classification Search
None
See application file for complete search history.

(56) References Cited

U.S. PATENT DOCUMENTS

| 2003/0139196 | A1* | 7/2003 | Medvedev | ........... H04B 7/0443 455/522 |
| 2010/0273515 | A1* | 10/2010 | Fabien | ................... H04L 5/006 455/509 |

(Continued)

FOREIGN PATENT DOCUMENTS

| CN | 101803430 A | 8/2010 |
| CN | 101808360 A | 8/2010 |

(Continued)

OTHER PUBLICATIONS

Chinese Office Action dated May 6, 2014 in corresponding Chinese Patent Application No. 201110083553.4.
(Continued)

*Primary Examiner* — Anez Ebrahim
*Assistant Examiner* — Ayanah George
(74) *Attorney, Agent, or Firm* — Staas & Halsey LLP

(57) ABSTRACT

The present invention discloses a method and an apparatus for controlling transmitting power and relates to the field of communications. The method includes: setting, according to a transmission state of data transmission using a first access technology, a power reduction value of transmitting power for data transmission using a second access technology; and controlling, according to the power reduction value, transmitting power for data transmission using the second access technology. The apparatus includes: a setting module, configured to set, according to a transmission state of data transmission using a first access technology, a power reduction value for transmitting power for data transmission using a second access technology; and a controlling module,
(Continued)

configured to control, according to the power reduction value, the transmitting power for data transmission using the second access technology.

15 Claims, 4 Drawing Sheets

(51) Int. Cl.
| | | |
|---|---|---|
| *H04W 52/16* | (2009.01) | |
| *H04W 76/02* | (2009.01) | |
| *H04W 52/24* | (2009.01) | |
| *H04W 88/06* | (2009.01) | |
| *H04W 52/40* | (2009.01) | |
| *H04W 52/50* | (2009.01) | |
| *H04W 52/14* | (2009.01) | |
| *H04W 52/38* | (2009.01) | |

(52) U.S. Cl.
CPC ....... *H04W 52/367* (2013.01); *H04W 76/026* (2013.01); *H04W 52/146* (2013.01); *H04W 52/38* (2013.01); *H04W 52/40* (2013.01); *H04W 52/50* (2013.01); *H04W 88/06* (2013.01); *Y02B 60/50* (2013.01)

(56) References Cited

U.S. PATENT DOCUMENTS

| | | | |
|---|---|---|---|
| 2012/0083310 A1 | 4/2012 | Zhao et al. | |
| 2012/0184265 A1* | 7/2012 | Love | H04W 72/1215 455/424 |
| 2012/0236735 A1* | 9/2012 | Nory | H04W 52/365 370/252 |
| 2012/0254093 A1* | 10/2012 | Smith | H04L 41/064 706/52 |
| 2013/0065590 A1 | 3/2013 | Jang et al. | |

FOREIGN PATENT DOCUMENTS

| | | |
|---|---|---|
| CN | 101925171 | 12/2010 |
| CN | 101932087 A | 12/2010 |
| EP | 2423783 | 2/2012 |
| EP | 2625906 A1 | 8/2013 |
| WO | 2009/154403 A2 | 12/2009 |
| WO | 2010/090567 A1 | 8/2010 |
| WO | 2011/002789 A1 | 1/2011 |
| WO | 2012/047958 A1 | 4/2012 |

OTHER PUBLICATIONS

International Search report issued Mar. 22, 2012, in corresponding International Patent Application No. PCT/CN2012/072809.
European Search Report issued Dec. 17, 2013, in corresponding European Patent Application No. 12 76 8218.5.
"3rd Generation Partnership Project; Technical Specification Group Radio Access Network; Evolved Universal Terrestrial Radio Access (E-UTRA); User Equipment (UE) radio transmission and reception (Release 10)," *3GPP TS 36. 101 V10.1.1* (Jan. 2011), Jan. 2011, pp. 1-58.
"3rd Generation Partnership Project; Technical Specification Group Radio Access Network; Evolved Universal Terrestrial Radio Access (E-UTRA); Medium Access Control (MAC) protocol specification (Release 10)," *3GPP TS 36.321 V10.0.0* (Dec. 2012), Dec. 2010, pp. 1-53.
"Change Request," *3GPP TSG-RAN2 Meeting #72bis*, (R2-110656), Dublin, Ireland, Jan. 17-21, 2011, pp. 1-5.
"Pcmax for CA," TSG-RAN Working Group 4 (Radio) meeting AH#5, (R4-110561), Source: Ericsson, ST-Ericsson, Agenda Item: 4.2.3, Document for: Discussion, Austin, TX., USA, Jan. 17-21, 2011, pp. 1-5.
"Definition of Pcmax,c," 3GPP TSG RAN4 #57AH, (R4-110567), Agenda item: 4.2.3, Source: Qualcomm Incorporated, Document for: Approval, Austin, Texas, USA, Jan. 17-21, 2010, pp. 1-2.
International Search Report, dated Jun. 14, 2012, in corresponding International Application No. PCT/CN2012/072809 (8 pp.).

* cited by examiner

METHOD AND APPARATUS FOR CONTROLLING TRANSMITTING POWER

CROSS-REFERENCE TO RELATED APPLICATIONS

This application is a continuation of International Application No. PCT/CN2012/072809, filed on Mar. 22, 2012, which claims priority to Chinese Patent Application No. 201110083553.4, filed on Apr. 2, 2011 both of which are hereby incorporated by reference in their entireties.

TECHNICAL FIELD

The present invention relates to the field of communications, and in particular, to a method and an apparatus for controlling transmitting power.

BACKGROUND

Currently, most user equipments support multiple access technologies and are capable of transmitting data simultaneously using multiple access technologies. When a user equipment transmits data using multiple access technologies, transmitting power of the user equipment is high and possibly exceeds the restriction of a specific absorption rate SAR (Specific Absorption Rate, specific absorption rate). So far, no solution is provided for controlling transmitting power of a user equipment that transmits data simultaneously using multiple access technologies so as to meet the restriction of the specific absorption rate SAR.

SUMMARY

To solve the aforesaid technical problem, embodiments of the present invention provide a method and an apparatus for controlling transmitting power. The technical solution is as follows:

According to one aspect of the present invention, a method for controlling transmitting power is provided, including:

setting, according to a transmission state of data transmission using a first access technology, a power reduction value of transmitting power for data transmission using a second access technology; and controlling, according to the power reduction value, the transmitting power for data transmission using the second access technology.

According to one aspect of the present invention, an apparatus for controlling transmitting power is provided, including a setting module and a controlling module, where:

the setting module is configured to set, according to a transmission state of data transmission using a first access technology, a power reduction value of transmitting power for data transmission using a second access technology; and the controlling module is configured to control, according to the power reduction value set by the setting module, the transmitting power for data transmission using the second access technology.

According to one aspect of the present invention, a method for reporting power headroom is provided, including:

reporting power headroom when a power headroom report trigger event is triggered, where:

the power headroom report trigger event includes at least one of a trigger event A, a trigger event B, a trigger event C, and a trigger event D, where:

the trigger event A is that a change value of a power reduction value after power headroom is reported exceeds a first threshold;

the trigger event B is that a change value of a path loss after power headroom is reported exceeds a second threshold;

the trigger event C is that there is uplink data transmitted during a current transmission time interval; and the trigger event D is that obtained uplink resources are capable of bearing power headroom to be reported.

According to one aspect of the present invention, an apparatus for reporting power headroom is provided, including a reporting module, where the reporting module is configured to report power headroom when a power headroom report trigger event is triggered, where:

the power headroom report trigger event includes at least one of a trigger event A, a trigger event B, a trigger event C, and a trigger event D, where:

the trigger event A is that a change value of a power reduction value after power headroom is reported exceeds a first threshold;

the trigger event B is that a change value of a path loss after power headroom is reported exceeds a second threshold;

the trigger event C is that there is uplink data transmitted during a current transmission time interval; and the trigger event D is that obtained uplink resources are capable of bearing power headroom to be reported.

The technical solution provided in the embodiments of the present invention provides the following benefits: By setting a power reduction value P-MPR for the transmitting power for data transmission using the second access technology according to the transmission state of data transmission using the first access technology and reducing the transmitting power for data transmission using the second access technology by the P-MPR, the transmitting power using the second access technology is controlled while the transmitting power using the first access technology is ensured. Thereby, the total transmitting power using multiple access technologies is controlled and the restriction of a specific absorption rate SAR is satisfied. In addition, by using the power headroom report triggering mechanisms in the embodiments of the present invention, the power headroom report triggering mechanisms are diversified, and when a user equipment reports power headroom by using these triggering mechanisms, the reporting of the power headroom is more timely at more reasonable reporting frequency.

DESCRIPTION OF EMBODIMENTS

To make the objectives, technical solutions, and advantages of the present invention more comprehensible, the following further describes the embodiments of the present invention in detail with reference to the accompanying drawings.

Embodiment 1

Figure 1:
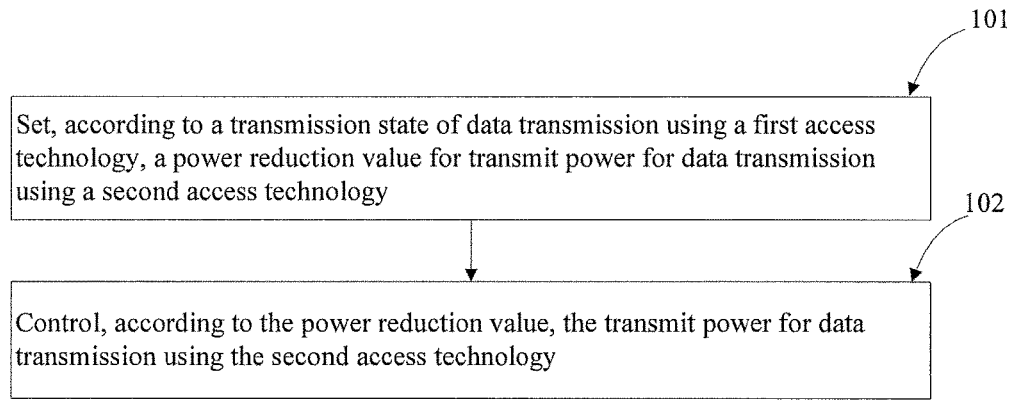
FIG. 1 is a flowchart of a method for controlling transmitting power according to Embodiment 1 of the present invention.

FIG. 1 illustrates a method for controlling transmitting power, where the executor of the method is a user equipment and the method specifically includes the following:

Step 101: Set, according to a transmission state of data transmission using a first access technology, a power reduction value of transmitting power for data transmission using a second access technology.

Step 102: Control, according to the power reduction value, the transmitting power for data transmission using the second access technology.

By setting a power reduction value of the transmitting power for data transmission using the second access technology according to the transmission state of data transmission using the first access technology and controlling the transmitting power for data transmission using the second access technology according to the power reduction value, the transmitting power using the second access technology is controlled while the transmitting power using the first access technology is ensured. Thereby, the total transmitting power using multiple access technologies is controlled and radiation on the human body is reduced.

Embodiment 2

Figure 2:
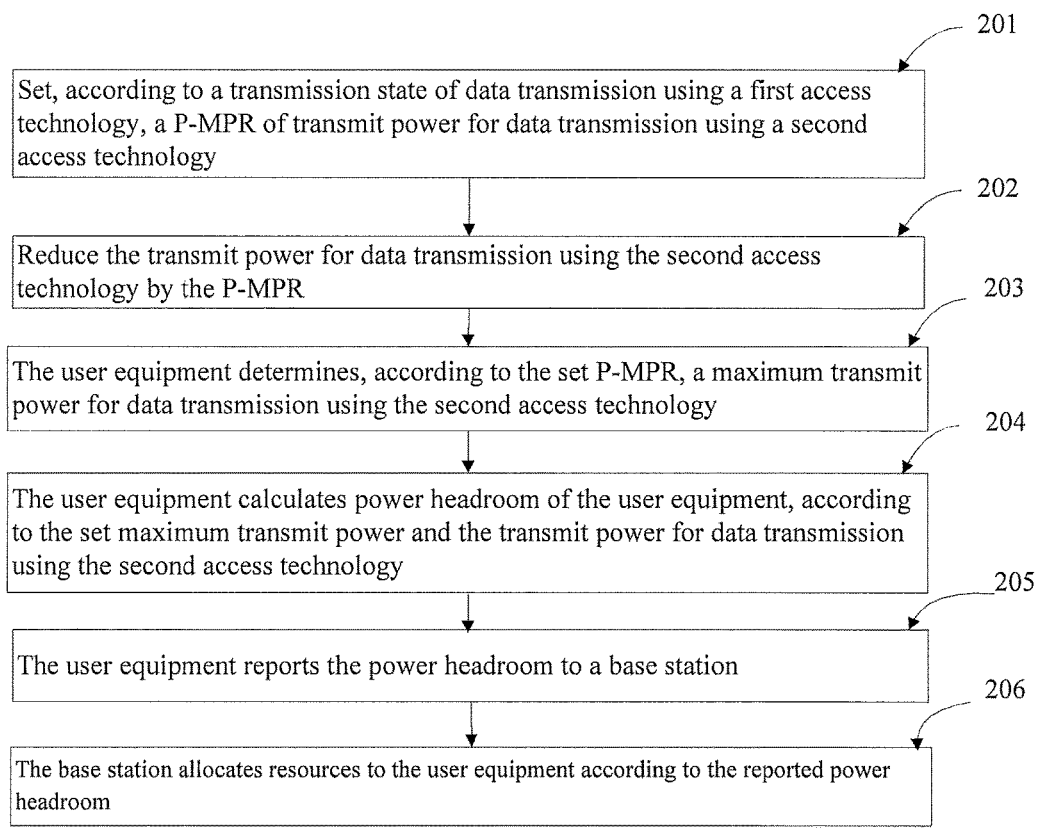
FIG. 2 is a flowchart of a method for controlling transmitting power according to Embodiment 2 of the present invention.

This embodiment uses an example where a user equipment supports data transmission using two radio access technologies, specifically 1xRTT (CDMA2000 1xRTT, CDMA2000 single-carrier radio transmission technology) and LTE, to clarify how transmitting power of a user equipment is controlled. As shown in FIG. 2, a method and an apparatus for controlling transmitting power includes specifically the following steps:

Step 201: A user equipment sets, according to a transmission state of data transmission using a first access technology, a P-MPR (Maximum Power Reduction set by Power Management Function, maximum power reduction set by power management function) of transmitting power for data transmission using a second access technology, where the transmission state includes: transmitting power, transmitted service, or transmitted data volume.

Specific operations are as follows:

Step 201-1: An internal PMF (Power Management Function, power management function) sets a first setting time when the user equipment transmits data using the first access technology, where the first setting time may be a fixed value or a dynamically adjusted value.

Specifically, the user equipment receives signaling broadcasted by a base station, such as RRC (Radio Resource Control, radio resource control) signaling, and sets the first setting time of the PMF according to a requirement of the signaling. The signaling is used to control measurement of the PMF, for example, it controls when the PMF begins a measurement and what the PMF measures; or The user equipment sets the first setting time of the PMF according to an internal configuration implementation. Different internal configuration implementations correspond to different first setting time.

Step 201-2: The internal PMF of the user equipment samples, within the set first setting time, a transmission state of data transmission using the first access technology.

Step 201-3: Set, according to a sampling result, a P-MPR of the transmitting power for data transmission using the second access technology.

It should be noted that, when the PMF sets the P-MPR of the transmitting power for data transmission using the second access technology, the PMF makes reference to not only the sampling result of the transmission state of data transmission using the first access technology, but also information such as transmitting power restricted by an SAR. This prevents the total sum of transmitting power for data transmission using the two access technologies from exceeding the transmitting power restricted by the SAR.

In one embodiment, a sampling process may be as follows:

The sampling of a transmission state of 1xRTT may be based on a service type used by 1xRTT. For example, at a first sampling point where only a voice service is used by 1xRTT, the service type is recorded, and further a P-MPR is set; when a second sampling point arrives where a voice and video service is determined, the service type of the service is recorded, and further a P-MPR is set. A process of setting a P-MPR by using the service type may be as follows: estimating power consumed by the service according to the service type and determining a P-MPR according to the estimated power consumed by the service.

Figure 3:
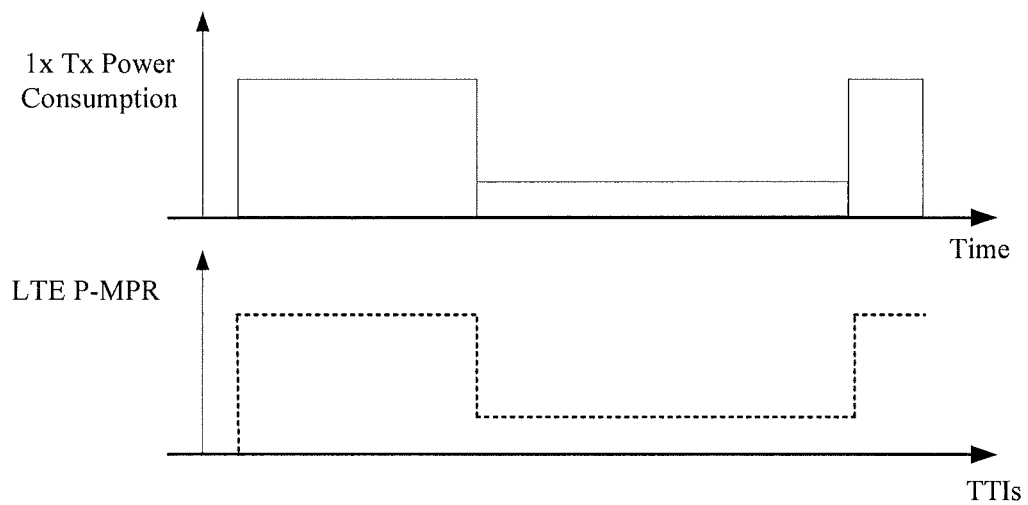
FIG. 3 is a schematic diagram of data transmission using two access technologies according to Embodiment 2 of the present invention.

As shown in FIG. 3, in this embodiment, the first access technology is 1xRTT and the second access technology is LTE. It is assumed that the user equipment is transmitting both a voice service using 1xRTT and a data service using LTE. In this embodiment, because the voice transmission service may be an emergency call service, whose priority is higher than the data transmission service, normal reception of the voice transmission service using 1xRTT needs to be first ensured. Therefore, to meet the requirement of the SAR, it is necessary to control the transmitting power for the data transmission service using LTE. For example:

1) set the first setting time of the PFM to one TTI (Transmission Time Interval, transmission time interval), which means one P_MPR is set for each TTI for LTE; the PMF samples, within the first setting time, a transmission state of data transmission using the first access technology at different moments; and set, according to the sampling result and with reference to the transmitting power restricted by the SAR, a P-MPR of the transmitting power for data transmission using the second access technology, ensuring that at one moment, the transmitting power of the user equipment transmitting data simultaneously using the first access technology and the second access technology does not exceed the transmitting power restricted by the SAR.

In addition, when the transmission state of the user equipment transmitting data using the first access technology stays stable, the first setting time of the PMF may be prolonged to a greater value, for example, a duration of 2 to 3 TTIs.

It should be noted that, when the sampling result is 0 that indicates no uplink data transmission of the user equipment using the first access technology at one moment, the PMF may set no P-MPR of the transmitting power for data transmission using the second access technology. That is, it is unnecessary for the user equipment to reduce the transmitting power for data transmission using the second access technology. Alternatively, the P-MPR for the second access technology may be set to 0, which means that the transmitting power for data transmission using the second access technology is reduced by the P-MPR whose value is 0.

2) receive RRC signaling sent by a base station, where the signaling specifies the first setting time of the user equipment; when there is uplink data transmitted using the first access technology, the user equipment samples a transmission state of data transmission using the first access technology, stops sampling when the transmission of the uplink data using the first access technology is complete, and sets a P-MPR for the second access technology according to the sampling result and with reference to the transmitting power restricted by the SAR, ensuring that at one moment, the transmitting power of the user equipment transmitting data simultaneously using the first access technology and the second access technology does not exceed the transmitting power restricted by the SAR. In one embodiment, the set P-MPR is proportional to the sampled volume of transmitted data.

3) receive RRC signaling sent by a base station, where the RRC signaling requires, for example, that the user equipment start sampling transmitting power using the first access technology when uplink data begins to be transmitted using the first access technology and stop sampling when the transmission of uplink data using the first access technology is complete; the user equipment starts sampling transmitting power using the first access technology when uplink data begins to be transmitted using the first access technology and stops sampling when the transmission of uplink data using the first access technology is complete; and the PMF estimates, according to the sampling result, a range of transmitting power consumed when data is transmitted using the first access technology within the first setting time, and sets, according to the estimated range of transmitting power and the transmitting power restricted by the SAR, a P-MPR of the transmitting power for data transmission using the second access technology, ensuring that at one moment, the transmitting power of the user equipment transmitting data simultaneously using the first access technology and the second access technology does not exceed the transmitting power restricted by the SAR.

It should be noted that the setting the P-MPR for the second access technology further includes the following circumstance:

The PMF sets a maximum P-MPR since the occurrence of a P-MPR as the P-MPR of the transmitting power for data transmission using the second access technology.

Specifically, the PMF first sets a P-MPR of the transmitting power for data transmission using the second access technology and judges whether the P-MPR currently obtained according to the sampling result and the transmitting power restricted by the SAR within the first setting time is greater than the previously set P-MPR. If yes, the PMF sets the P-MPR for the second access technology to the P-MPR currently obtained within the first setting time; or, if no, the PMF keeps the previously set P-MPR as the P-MPR of the transmitting power for data transmission using the second access technology. Such operations ensure that the P-MPR set for the transmitting power for data transmission using the second access technology has a greatest value, which means that the transmitting power for data transmission using the second access technology is reduced to the greatest extent.

In addition, in the embodiment, it should be noted that, for simplification of operations, at one moment when a voice service is transmitted using 1xRTT, the transmitting power for data transmission using the second technology may be directly set to 0, that is, a simultaneous data transmission service using the second access technology is suspended, and after the voice transmission service using 1xRTT is complete, the data transmission service using the second access technology is resumed. To enhance user experience, such simplified operations are not adopted in the embodiment of the present invention. Instead, a P-MPR is set for the transmitting power for data transmission using the second access technology, and thereby some transmitting power is maintained for the second access technology. This allows the transmission of a simultaneous data service using LTE while ensuring the voice transmission service using 1xRTT and the SAR.

Step 202: The user equipment reduces the transmitting power for data transmission using the second access technology by the P-MPR.

Specifically, when there is uplink data transmitted using the second access technology, the user equipment reduces the transmitting power for data transmission using the second access technology by the currently set P-MPR.

When there is no uplink data transmitted using the second access technology, the user equipment uses a P-MPR whose value is 0, which means that the user equipment does not reduce the transmitting power for data transmission using the second access technology.

It should be noted that, when there is no uplink data transmitted using the second access technology, the user equipment may also reduce the transmitting power for data transmission using the second access technology by the currently set P-MPR.

In a specific implementation, the user equipment reduces the transmitting power for data transmission using the second access technology by the P-MPR based on a predetermined reduction point. The predetermined reduction point may be a 1 dB compression point, maximum transmitting power configured by the base station for a current carrier, or maximum transmitting power of a power class of the user equipment.

The power reduction operation is described by using an example where the predetermined reduction point is a 1 dB compression point. The input power of a power amplifier for the user equipment is reduced by P-MPR decibels from the 1 dB compression point, so that the user equipment works on a level far below the 1 dB compression point. Thereby, the power amplifier is kept far from a saturation region and enters a linear working region. The amplifier has a linear dynamic range, within which the output power of the amplifier linearly increases with the input power. When the input power increases continuously and the amplifier gradually enters the saturation region, the power gain begins to drop. Normally, the output power value when the gain drop is 1 dB lower than the linear gain is defined as the 1 dB compression point of the output power.

The above operations ensure that the transmitting power of the user equipment for data transmission using the second access technology is reduced when the user equipment transmits a service using the first access technology. Thereby, the total transmitting power at one moment when the user equipment transmits data using two access technologies is reduced, which meets the requirement of the transmitting power restricted by the SAR.

It should be noted that, in LTE and LTE-A systems, uplink power resources allocated by a base station to a user equipment should normally not exceed the maximum transmitting power of the user equipment. To ensure this, the user equipment needs to report power headroom to the base station. In a PHR (Power Headroom Report, power headroom report) process, the user equipment provides the base station with a difference value between the maximum transmitting power of the user equipment and an estimated value of the current transmitting power of the user equipment. This difference value is the power headroom. The base station allocates resources to the user equipment according to the power headroom reported by the user equipment. This is specifically as follows:

Step 203: The user equipment determines, according to the set P-MPR, a maximum transmitting power for data transmission using the second access technology.

Specifically, if the P-MPR is 0, or if the PMF does not set a P-MPR, or if no uplink data is transmitted on the current carrier, an upper limit of the transmitting power of the user equipment for data transmission using the second access technology is set to: $\text{MIN}\{PE_{MAX}, P_{POWERCLASS}\}$.

The $PE_{MAX}$ is the maximum transmitting power configured by the base station for the current carrier. It is broadcasted by the base station to the user equipment. Specifically, the base station sets the $PE_{MAX}$ according to the uplink transmitting power of the user equipment using the current carrier monitored in real time, and broadcasts the $PE_{MAX}$ to the user equipment.

The $P_{POWERCLASS}$ is the maximum transmitting power of the power class to which the user equipment belongs.

In addition, when the transmitting power of the user equipment for data transmission using the second access technology is reduced by the P-MPR based on the $P_{POWERCLASS}$, in this step, the upper limit of the transmitting power of the user equipment for data transmission using the second access technology may alternatively be set to: $\text{MIN}\{PE_{MAX}, P_{POWERCLASS}-\text{P-MPR}\}$; or when the transmitting power of the user equipment for data transmission using the second access technology is reduced by the P-MPR based on the $PE_{MAX}$, in this step, the upper limit of the transmitting power of the user equipment for data transmission using the second access technology may alternatively be set to: $\text{MIN}\{PE_{MAX}-\text{P-MPR}, P_{POWERCLASS}\}$.

In this step, the user equipment sets the maximum transmitting power for data transmission using the second access technology to a value not greater than the $PE_{MAX}$ or $P_{POWERCLASS}$, which ensures that the transmitting power of the user equipment for data transmission does not exceed the factory-defined maximum transmitting power or the maximum transmitting power on the current carrier. This enables the user equipment to normally transmit data using the second access technology.

In addition, the embodiment also includes setting a lower limit of the transmitting power of the user equipment for data transmission using the second access technology to: $\text{MIN}\{PEMAX-DT_C, P_{POWERCLASS}-\text{max(MPR+A-MPR, P-MPR)}-DT_C\}$.

The $DT_C$ is an adjustment value obtained according to the $PE_{MAX}$ so as to adjust the maximum transmitting power on the current carrier, thereby reducing interference between transmitting power of user equipments on the current carrier.

The MPR and A-MPR are a power reduction value and an additional power reduction value determined based on broadband and resource information.

Step 204: The user equipment calculates power headroom of the user equipment according to the set maximum transmitting power and the transmitting power for data transmission using the second access technology.

Specifically, the user equipment deducts the current estimated value of the transmitting power for data transmission using the second access technology from the set maximum transmitting power using the second access technology to obtain the power headroom.

Step 205: The user equipment reports the power headroom to a base station.

Specifically, when a power headroom report trigger event is triggered, the user equipment reports the power headroom to the base station.

It should be noted in advance that radio resource control of the base station controls a PHR process by configuring two timers, a first threshold and a second threshold. Specifically, the first threshold is a downlink path loss change threshold, the second threshold is a P-MPR change threshold, and the two configured timers are respectively a periodic power headroom report timer and a prohibit power headroom report timer.

Therefore, based on the above configuration of the base station, PHR trigger events include:

1. A PHR process is triggered when a change value of the P-MPR of the user equipment set according to the preceding step after the last PHR transmission exceeds a P-MPR change threshold preconfigured by the base station.

2. A PHR process is triggered when a change value of path loss of the user equipment after the last PHR transmission exceeds a downlink path loss change threshold preconfigured by the base station.

3. A PHR process is triggered when the user equipment has an uplink resource to transmit new data and a change value of the P-MPR set according to the preceding step after the last PHR transmission exceeds a P-MPR change threshold preconfigured by the base station.

4. A PHR process is triggered when the user equipment has an uplink resource to transmit new data and a change value of path loss after the last PHR transmission exceeds a downlink path loss change threshold preconfigured by the base station.

5. A PHR process is triggered when the user equipment has an uplink resource to transmit new data, the prohibit power headroom report timer expires or has expired, and a change value of the P-MPR set according to the preceding step after the last PHR transmission exceeds a P-MPR change threshold PMPR-ChangeThreshold preconfigured by the base station.

6. A PHR process is triggered when the user equipment has an uplink resource to transmit new data, the prohibit power headroom report timer expires or has expired, and a change value of path loss after the last PHR transmission exceeds a downlink path loss change threshold preconfigured by the base station.

Trigger mechanisms 5 and 6 use the prohibit power headroom report timer configured by the base station to restrict the frequency of PHR triggering on the basis of trigger mechanisms 3 and 4. This avoids frequent PHR triggering and thereby avoids unnecessary power headroom reports.

It should be noted that this trigger mechanism further includes: when a P-MPR change threshold and a path loss change threshold are preconfigured by the base station to infinity, the base station may not pre-configure the prohibit power headroom report timer to avoid unnecessary signaling overhead.

7. A PHR process is triggered when the periodic power headroom report timer expires.

8. A PHR process is triggered when a configure or reconfigure power headroom report that does not prohibit the function is received from a high layer.

On the premise that the user equipment has an uplink resource to transmit new data during a TTI using the second access technology, if it is a first uplink resource allocation for new data transmission after MAC (Medium Access Control, Media Access Control) is reset, the periodic power headroom report timer is started. On the premise that the user equipment has an uplink resource to transmit new data during the TTI, if the power headroom report process judges that at least one PHR is triggered after the last PHR transmission or it is a first triggered PHR, and if the allocated uplink resource is capable of accommodating the transmission of a PHR and its MAC sub-header during logical channel priority processing, power headroom data is obtained from a physical layer; a multiplexing and combining process is notified to generate and transmit PHR MAC control units based on the data reported by the physical layer; the periodic power headroom report timer is started or restarted; the prohibit power headroom report timer is started or restarted; and all triggered PHRs are canceled.

When a P-MPR change threshold or downlink path loss change threshold pre-configured by the base station is configured to infinity, the base station does not need to pre-configure the prohibit power headroom report timer, and the user equipment no longer needs to start or restart the prohibit power headroom report timer. This reduces signaling overhead between the user equipment and the base station.

In addition to the above trigger mechanisms, PHR trigger events provided in the embodiment of the present invention further include:

9. A PHR process is triggered at one moment when the user equipment begins to transmit data and/or stops transmitting data using the first access technology.

By using trigger mechanism 9, the user equipment can report its power headroom to the base station in time.

10. A PHR process is triggered at one moment when the user equipment transmits uplink data using the second access technology.

By using trigger mechanism 10, the user equipment can report its power headroom at the moment of triggering to the base station in time.

11. A PHR process is triggered when uplink resources in the current timeslot of the user equipment are capable of bearing the PHR to be triggered.

It should be noted in advance that the base station configures a valid PHR triggering timer (validPHR-timer) for the user equipment to control a PHR reporting process.

Then, based on the above configuration of the base station, a PHR trigger event also includes the following control:

12. When a PHR is triggered, a first timer is started or restarted, where the first timer is specifically the valid PHR triggering timer used to control the time when a PHR is triggered.

When the valid PHR triggering timer expires, the user equipment cancels the triggered PHR; or, when the valid PHR triggering timer expires and the user equipment does not meet the foregoing PHR trigger events, the user equipment cancels the triggered PHR.

Specifically, the user equipment starts the valid PHR triggering timer (validPHR-timer) at one moment when the first PHR is triggered after the last PHR is reported. The user equipment may also restart the validPHR-timer later when another PHR is triggered. When the validPHR-timer expires, the user equipment cancels the triggered PHR; or, when the validPHR-timer expires, the user equipment re-judges whether the current state meets a PHR trigger event, and if not, the user equipment cancels the triggered PHR.

It should be stressed that the above trigger mechanisms are applicable to PHR reporting in any circumstance and any scenario.

Step 206: The base station allocates resources to the user equipment according to the reported power headroom.

In addition, it should be noted that, at present, in order to obtain higher peak data rates in an LTE-A system, a carrier aggregation technology, that is, LTE multi-carrier transmission technology, is introduced. In a system adopting the multi-carrier transmission technology, a user equipment supports data transmission on one or more member carriers in order to obtain higher bandwidth. Therefore, in the carrier-aggregated communications system, when a UE works on multiple carriers and is transmitting data, the user equipment is allowed to control transmitting power for data transmission on the carriers. The controlling by the user equipment the transmitting power of the user equipment on multiple carriers using an access technology is basically the same as the foregoing step 201 to step 202, with a slight difference in that:

The method of step 201 is used to set a corresponding P-MPR for the transmitting power for data transmission on each of the multiple carriers using the second access technology; or The method of step 201 is used to set a total P-MPR for the transmitting power of the user equipment for data transmission using the second access technology, where the P-MPR is used to reflect the total P-MPR on multiple carriers.

In addition, when the user equipment works on multiple carriers, the base station is allowed to schedule the user equipment to transmit uplink data simultaneously on all or a part of the carriers. In this case, in order that the base station properly schedules resources for a user equipment, it is necessary that the user equipment report its power headroom. The reporting by the user equipment its power headroom when multiple carriers exist in an access technology is basically the same as the foregoing step 203 to step 206, with a slight difference in that:

The upper limit of the maximum transmitting power of the user equipment for data transmission using the second access technology may be set to $\text{MIN}\{PE_{MAX}, P_{POWERCLASS}\}$, $\text{MIN}\{PE_{MAX}, P_{POWERCLASS}-\text{P-MPR}\}$, or $\text{MIN}\{PE_{MAX}-\text{P-MPR}, P_{POWERCLASS}\}$, A corresponding P-MPR is set for the transmitting power for data transmission on each of the multiple carriers using the second access technology, and the P-MPR in the above formulas is the P-MPR on each carrier;

A total P-MPR is set for the transmitting power of the user equipment for data transmission using the second access technology, where the P-MPR is used to reflect a sum of P-MPRs of the transmitting power of the user equipment for data transmissions on the carriers, and the P-MPR in the above formulas is the P-MPR of the user equipment, or a sum of Per CC P-MPRs; for example:

MIN{sigma($PE_{MAX}$),$P_{POWERCLASS}$}, or MIN{sigma ($PE_{MAX}$),$P_{POWERCLASS}$-P-MPR}, or MIN{sigma ($PE_{MAX}$),-P-MPR, $P_{POWERCLASS}$};

The other parameters in the formulas have the same meanings as those in step 203 and are not repeated herein.

The foregoing describes a process where the user equipment controls the transmitting power for simultaneous data transmission using two access technologies (single-carrier or multi-carrier) and reports its power headroom. This process is also applicable to the control of transmitting power when the user equipment transmits data simultaneously using the above two access technologies. The implementation mode is similar and is not further described herein.

The embodiment of the present invention provides the following benefits: by setting a P-MPR for the transmitting power for data transmission using the second access technology according to a transmission state of data transmission using the first access technology and reducing the transmitting power for data transmission using the second access technology by the P-MPR, the total transmitting power when the user equipment transmits data simultaneously using two or more access technologies does not exceed the transmitting power restricted by the SAR. While the transmission of an emergency service using one access technology is ensured, the transmitting power for data transmission using another access technology is also ensured. In addition, in a PHR triggering process, the user equipment sets timers to control the frequency of PHR triggering, which avoids unnecessary power headroom reports. Moreover, by setting a threshold to infinity, the user equipment does not need to set a timer, or set a trigger event to start or restart the timer, which reduces signaling overhead between the user equipment and the base station. What's more, by setting a valid PHR triggering timer, the PHR trigger events are controlled so that unnecessary PHR triggering is canceled.

Embodiment 3

Figure 4:
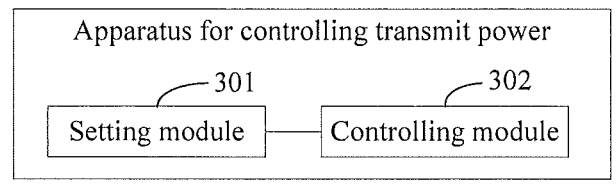
FIG. 4 is a diagram of an apparatus for controlling transmitting power according to Embodiment 3 of the present invention.

FIG. 4 illustrates an apparatus for controlling transmitting power. For a structure and functions of the apparatus, reference may be made to the user equipment in method embodiment 2. The apparatus includes a setting module 301 and a controlling module 302.

The setting module 301 is configured to set, according to a transmission state of data transmission using a first access technology, a power reduction value for transmitting power for data transmission using a second access technology, where the transmission state includes: transmitting power, transmitted content, or transmitted data.

The controlling module 302 is configured to control, according to the power reduction value set by the setting module 301, the transmitting power for data transmission using the second access technology.

The setting module 301 specifically includes:

a first setting unit 3011, configured to determine a first setting time according to signaling configuration or internal setting;

a sampling unit 3012, configured to sample, within the first setting time set by the first setting unit 3011, a transmission state using the first access technology; and a second setting unit 3013, configured to set, according to a sampling result obtained by the sampling unit 3012, the power reduction value of the transmitting power for data transmission using the second access technology, so that the transmitting power satisfies a maximum transmitting power required by a specific absorption rate.

The setting module 301 further includes:

an adjusting unit 3015, configured to: when the power reduction value set by the second setting unit 3013 is less than a previously set power reduction value, adjust the power reduction value set within the first setting time to the previously set power reduction value.

The controlling module 302 includes:

a reducing unit 3012, configured to reduce the transmitting power for data transmission using the second access technology by the power reduction value;

a setting unit 3022, configured to set, according to the power reduction value set by the setting module 301, a maximum transmitting power for data transmission using the second access technology;

a calculating unit 3023, configured to calculate power headroom for data transmission using the second access technology according to the maximum transmitting power obtained by the setting unit 3022 and a current transmitting power for data transmission using the second access technology; and a reporting unit 3024, configured to report the power headroom obtained by the calculating unit 3023 to a base station, so that the base station allocates resources according to the power headroom.

Specifically, the reducing unit 3021 is configured to reduce the transmitting power for data transmission using the second access technology by the power reduction value when there is uplink data to be transmitted using the second access technology.

The setting unit 3032 is specifically configured to select a smaller value from {$PE_{MAX}$, $P_{POWERCLASS}$} as the maximum transmitting power for the second access technology; or the setting unit 3032 is specifically configured to select a smaller value from {$PE_{MAX}$, $P_{POWERCLASS}$-P-MPR} as the maximum transmitting power for the second access technology; or the setting unit 3032 is specifically configured to select a smaller value from {$PE_{MAX}$-P-MPR, $P_{POWERCLASS}$} as the maximum transmitting power for the second access technology;

where, $PE_{MAX}$ is a maximum transmitting power configured by the base station for a current carrier; $P_{POWERCLASS}$ is a maximum transmitting power of a power class to which the user equipment belongs; and P-MPR is the power reduction value.

The embodiment of the present invention provides the following benefits: by setting a P-MPR for the transmitting power for data transmission using the second access technology according to a transmission state of data transmission using the first access technology and reducing the transmitting power for data transmission using the second access technology by the P-MPR, the total transmitting power when the user equipment transmits data simultaneously using two or more access technologies does not exceed the transmitting power restricted by the SAR. While the transmission of an emergency service using one access technology is ensured, the transmitting power for data transmission using another access technology is also ensured. In addition, in a PHR triggering process, the user equipment sets timers to control the frequency of PHR triggering, which avoids unnecessary power headroom reports. Moreover, by setting a threshold to infinity, the user equipment does not need to set a timer, or set a trigger event to start or restart the timer, which reduces signaling overhead between the user equipment and the base station. What's more, by setting a valid PHR triggering timer, the PHR trigger events are controlled so that unnecessary PHR triggering is canceled.

Embodiment 4

Figure 5:
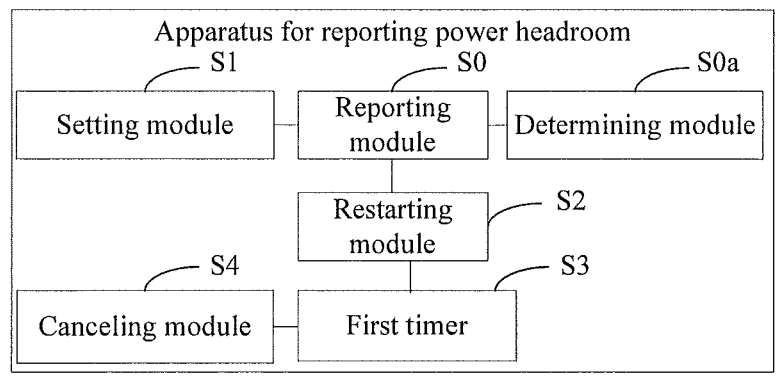
FIG. 5 is a diagram of an apparatus for reporting power headroom according to Embodiment 4 of the present invention.

FIG. 5 illustrates an apparatus for reporting power headroom. For functions and a structure of the apparatus, reference may be made to method embodiment 2. The apparatus includes a determining module S0a and a reporting module S0. The determining module S0a is configured to determine that a power headroom report trigger event is triggered. The reporting module S0 is configured to report power headroom when the reporting module S0a determines that a power headroom report trigger event is triggered.

Specifically, the power headroom report trigger event includes at least one of a trigger event A, a trigger event B, a trigger event C, and a trigger event D.

The trigger event A in a first setting time is that a change value of a power reduction value after power headroom is reported exceeds a first threshold.

The trigger event B in the first setting time is that a change value of a path loss after power headroom is reported exceeds a second threshold.

The trigger event C in the first setting time is that there is uplink data transmitted during a current transmission time interval.

The trigger event D in the first setting time is that an obtained uplink resource is capable of bearing power headroom to be reported.

Specifically, the reporting module S0 is further configured to report power headroom when the trigger event A, a trigger event E, and a trigger event F all occur, where the trigger event E is that a prohibit power headroom report timer expires, and the trigger event F is that uplink resources used to transmit new data are obtained.

The reporting module S0 is further configured to report power headroom when the trigger event B, trigger event E, and trigger event F all occur, where the trigger event E is that a prohibit power headroom report timer expires, and the trigger event F is that uplink resources used to transmit new data are obtained.

Specifically, the apparatus further includes a setting module S1, a restarting module S2, a first timing module S3, a canceling module S4, and a receiving module S5.

The setting module S1 is configured to set a power reduction value. The setting module S1 includes the following units:

a first setting unit S011, configured to determine a first setting time;

a sampling unit S012, configured to sample, within the first setting time set by the first setting unit S011, a transmission state of data transmission using a first access technology; and a second setting unit S013, configured to set, according to a sampling result obtained by the sampling unit S012, a power reduction value for transmitting power for data transmission using a second access technology.

The restarting module S2 is configured to start or restart the first timer when a power headroom report is triggered.

The first timer S3 is configured to control time for triggering a power headroom report.

The canceling module S4 is configured to cancel a triggered power headroom report when the first timer S3 expires; or the canceling module S4 is configured to cancel a triggered power headroom report when the first timer S3 expires and no power headroom report trigger event occurs.

The receiving module S5 is configured to receive configuration information from a base station, where the configuration information is used to configure the first threshold, second threshold, prohibit power headroom report timer, and first timer.

It should be noted that the first threshold, second threshold, prohibit power headroom report timer, and first timer are configured by the base station.

When the first threshold is configured by the base station to infinity, the base station does not configure the prohibit power headroom report timer.

When the second threshold is configured by the base station to infinity, the base station does not configure the prohibit power headroom report timer.

According to the technical solution of the present invention, in a PHR triggering process, a user equipment sets timers to control the frequency of PHR triggering, which avoids unnecessary power headroom reports. Moreover, by setting a threshold to infinity, the user equipment does not need to set a timer, or set a trigger event to start or restart the timer, which reduces signaling overhead between the user equipment and the base station. What's more, by setting a valid PHR triggering timer, the PHR trigger events are controlled so that unnecessary PHR triggering is canceled.

Embodiment 5

Figure 6:
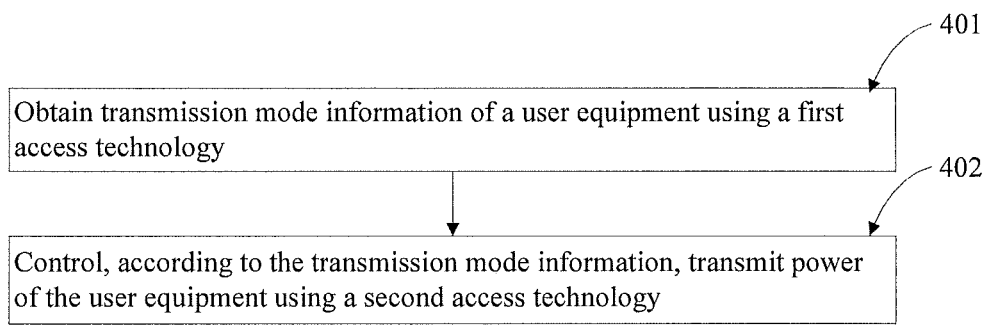
FIG. 6 is a flowchart of a method for controlling transmitting power according to Embodiment 5 of the present invention.

FIG. 6 illustrates a method for controlling transmitting power, where the executor of the method is a base station and the method specifically includes the following:

Step 401: Obtain transmission mode information of a user equipment using a first access technology.

Step 402: Control, according to the transmission mode information, transmitting power of the user equipment using a second access technology.

The embodiment of the present invention provides the following benefits: by obtaining transmission mode information of a user equipment using a first access technology and controlling transmitting power of the user equipment using a second access technology according to the transmission mode information, the transmitting power of the user equipment using the second access technology is controlled while the transmitting power of the user equipment using the first access technology is ensured. Thereby, the total transmitting power of the user equipment using multiple access technologies is controlled and radiation on the human body is reduced.

Embodiment 6

Figure 7:
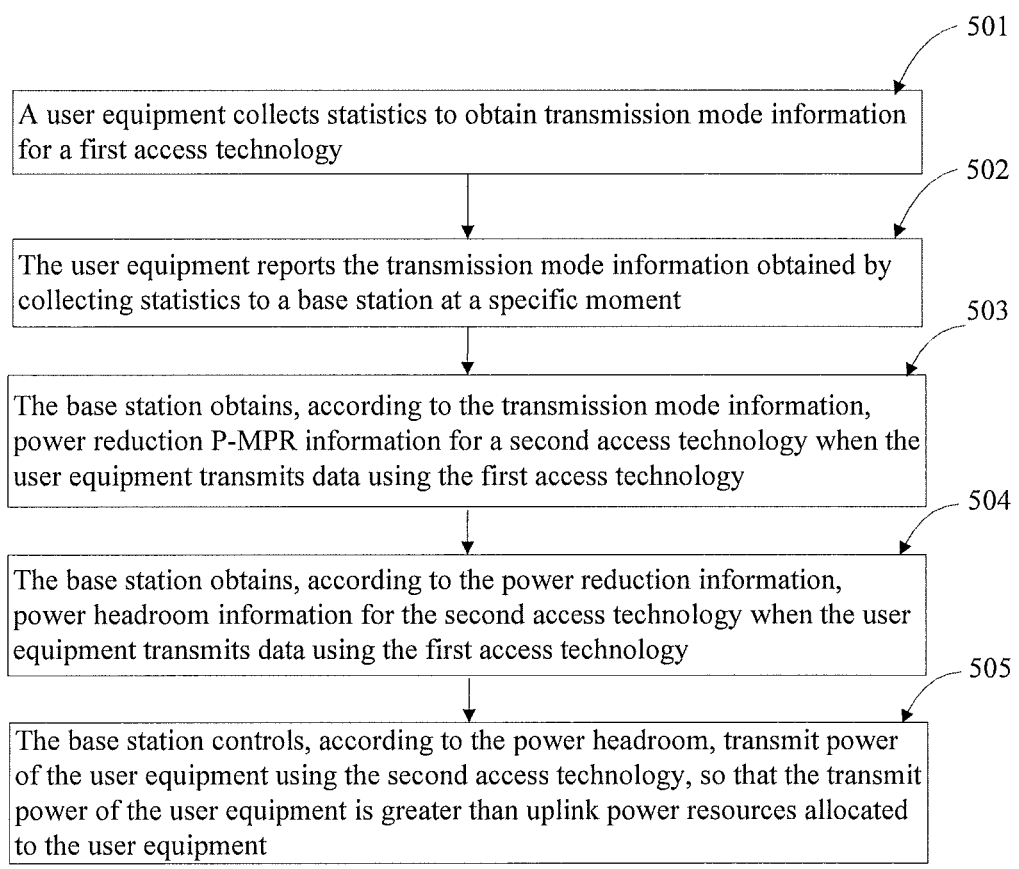
FIG. 7 is a flowchart of a method for controlling transmitting power according to Embodiment 6 of the present invention.

The following uses an example where a user equipment supports data transmission using two radio access technologies, specifically 1xRTT (or GERAN, or UMTS) and LTE, to clarify how transmitting power of the user equipment is controlled. As shown in FIG. 7, a method for controlling transmitting power includes specifically the following steps:

Step 501: The user equipment collects statistics to obtain transmission mode information for a first access technology.

The transmission mode information includes time interval information for data transmission using the first access technology;

data volume information of data transmitted using the first access technology at one moment when data is transmitted using the first access technology; and information about transmitting power consumed for the first access technology at one moment when data is transmitted using the first access technology.

Step 502: The user equipment reports the transmission mode information obtained by collecting statistics to a base station at a specific moment.

Specifically, when the first access technology is 1xRTT or UMTS (Universal Mobile Telecommunications System, Universal Mobile Telecommunications System), the specific moment is each Talk Burst moment, that is, a moment when the user equipment starts or ends a voice segment using the first access technology. Specifically, the specific moment may be a first Talk Burst moment, that is, a moment when the user equipment starts or ends a first voice segment using the first access technology.

When the first access technology is GERAN (GSM EDGE Radio Access Network, GSM EDGE radio access network), the specific moment is a moment when a CS timeslot is configured for the user.

Step 503: The base station obtains, according to the transmission mode information, power reduction P-MPR information for the second access technology when the user equipment transmits data using the first access technology.

Step 504: The base station obtains, according to the power reduction information, power headroom information for the second access technology when the user equipment transmits data using the first access technology.

Step 505: The base station controls, according to the power headroom, transmitting power of the user equipment using the second access technology, so that the transmitting power of the user equipment is greater than uplink power resources allocated to the user equipment.

For example, at one occurrence moment, or overlapping moment, or adjacent moment of data transmission of the user equipment using the first access technology, no or few resources, and/or a lower order modulation and demodulation mode is allocated to the user. When the user equipment transmits no data using the first access technology, more resources and/or a higher order modulation and demodulation mode is allocated to the terminal. This avoids high transmitting power of the terminal that exceeds the transmitting power restricted by the SAR and avoids waste of LTE resources due to the restriction on the transmitting power.

The embodiment of the present invention provides the following benefits: by obtaining transmission mode information of a user equipment using a first access technology and controlling transmitting power of the user equipment using a second access technology according to the transmission mode information, the transmitting power of the user equipment using the second access technology is controlled while the transmitting power of the user equipment using the first access technology is ensured. Thereby, the total transmitting power of the user equipment using multiple access technologies is controlled and radiation on the human body is reduced.

Embodiment 7

Figure 8:
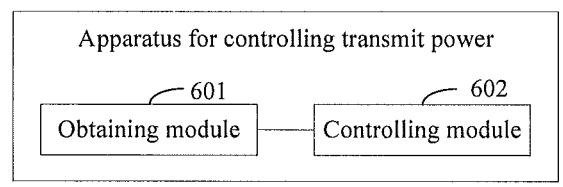
FIG. 8 is a diagram of an apparatus for controlling transmitting power according to Embodiment 7 of the present invention.

FIG. 8 illustrates an apparatus for controlling transmitting power. The apparatus corresponds to the base station in method embodiment 4 and includes an obtaining module 601 and a controlling module 602.

The obtaining module 601 is configured to obtain transmission mode information of a user equipment using a first access technology.

The controlling module 602 is configured to control, according to the transmission mode information obtained by the obtaining module 601, transmitting power of the user equipment using a second access technology.

The obtaining module 601 is specifically configured to receive the transmission mode information of the user equipment using the first access technology reported by the user equipment at a specific moment, where the transmission mode information is obtained by collecting statistics by the user equipment and includes at least: time interval information of data transmission, data volume information at the moment of data transmission, and transmitting power information at the moment of data transmission.

The controlling module 602 includes:

a first obtaining unit 6021, configured to obtain, according to the transmission mode information, power reduction information for the second access technology when the user equipment transmits data using the first access technology;

a second obtaining unit 6022, configured to obtain, according to the power reduction information obtained by the first obtaining unit 6021, power headroom for the second access technology when the user equipment transmits data using the first access technology; and a controlling unit 6023, configured to control, according to the power headroom obtained by the second obtaining unit 6022, the transmitting power of the user equipment using the second access technology, so that the transmitting power of the user equipment is greater than uplink power resources allocated to the user equipment.

The embodiment of the present invention provides the following benefits: by obtaining transmission mode information of a user equipment using a first access technology and controlling transmitting power of the user equipment using a second access technology according to the transmission mode information, the transmitting power of the user equipment using the second access technology is controlled while the transmitting power of the user equipment using the first access technology is ensured. Thereby, the total transmitting power of the user equipment using multiple access technologies is controlled and radiation on the human body is reduced.

All or a part of the contents in the technical solution provided in the foregoing embodiments can be implemented using software programming, where a software program is stored in a readable storage medium, such as a hard disk, an optical disc, or a floppy disk in a computer.

The foregoing descriptions are merely exemplary embodiments of the present invention, and are not intended to limit the present invention. Any modification, equivalent replacement, or improvement derived within the spirit and principle of the present invention shall fall within the protection scope of the present invention.

What is claimed is:

1. A method for controlling transmitting power, comprising:
setting in response to a first data transmission using a first access technology while performing a second data transmission using a second access technology, according to a service type of the first data transmission using the first access technology, a power reduction value for transmitting power for the second data transmission using the second access technology; and
controlling, according to the power reduction value, the transmitting power for the second data transmission using the second access technology, wherein
  the service type of the first data transmission using the first access technology is a voice service which is determined according to a sampling, within a set time period, of the first data transmission using the first access technology,
  the power reduction value is determined according to an estimated power consumed by the voice service,
  the time period being set through signaling from a base station.

2. The method according to claim 1, wherein the signaling is a radio resource control (RRC) signaling.

3. The method according to claim 1, wherein:
  when the power reduction value set within the set time period is less than a previously set power reduction value, adjusting the power reduction value set within the set time period to the previously set power reduction value.

4. The method according to claim 1, wherein the controlling, according to the power reduction value, the transmitting power for the second data transmission using the second access technology comprises:
  reducing the transmitting power for the second data transmission using the second access technology by the power reduction value, and setting, according to the power reduction value, a maximum transmitting power for the second data transmission using the second access technology;
  calculating power headroom for the second data transmission using the second access technology according to the maximum transmitting power for the second data transmission using the second access technology and the transmitting power for the second data transmission using the second access technology; and
  reporting the power headroom to a base station.

5. The method according to claim 4, wherein the reducing the transmitting power for the second data transmission using the second access technology by the power reduction value, comprises:
  when there is uplink data to be transmitted using the second access technology, reducing the transmitting power for transmission of the uplink data using the second access technology by the power reduction value.

6. The method according to claim 4, wherein the setting, according to the power reduction value, the maximum transmitting power for the second data transmission using the second access technology, comprises:
  selecting a smaller value from $\{PE_{MAX}, P_{POWERCLASS} -P\text{-}MPR\}$ as the maximum transmitting power for the second access technology; or
  selecting a smaller value from $\{PE_{MAX} -P\text{-}MPR, P_{POWERCLASS}\}$ as the maximum transmitting power for the second access technology;
  wherein: $PE_{MAX}$ is a maximum transmitting power configured by the base station for a current carrier;
  $P_{POWERCLASS}$ is a maximum transmitting power of a power class to which a user equipment belongs; and
  P-MPR is the power reduction value.

7. An apparatus for controlling transmitting power, comprising:
  non-transitory computer readable storage medium to store a program; and
  computer hardware configured, including configured by the program, to:
    set in response to a first data transmission using a first access technology while performing a second data transmission using a second access technology, according to a service type of the first data transmission using the first access technology, a power reduction value for transmitting power for the second data transmission using the second access technology; and
    control, according to the power reduction value, the transmitting power for the second data transmission using the second access technology,
    wherein
      the service type of the first data transmission using the first access technology is a voice service which is determined according to a sampling, within a set time period, of the first data transmission using the first access technology,
      the power reduction value is determined according to an estimated power consumed by the voice service,
      the time period being set through signaling from a base station.

8. The apparatus according to claim 7, wherein the signaling is according to a radio resource control (RRC) signaling.

9. The apparatus according to claim 7, wherein the computer hardware is further configured to:
  adjust the power reduction value set within the set time period, when the power reduction value is less than a previously set power reduction value, to the previously set power reduction value.

10. The apparatus according to claim 7, wherein the computer hardware is further configured to:
  reduce the transmitting power for the second data transmission using the second access technology by the power reduction value;
  set a maximum transmitting power for the second data transmission using the second access technology;
  calculate a power headroom for the second data transmission using the second access technology according to the maximum transmitting power and the transmitting power for the second data transmission using the second access technology; and
  report the power headroom to a base station.

11. The apparatus according to claim 10, wherein the computer hardware is further configured to reduce the transmitting power for transmission of the uplink data using the second access technology by the power reduction value when there is uplink data to be transmitted using the second access technology.

12. The apparatus according to claim 10, wherein the computer hardware is further configured to:
  select a smaller value from $\{PE_{MAX}, P_{POWERCLASS} -P\text{-}MPR\}$ as the maximum transmitting power for the second access technology; or
  select a smaller value from $\{PE_{Max} -P\text{-}MPR, P_{POWERCLASS}\}$ as the maximum transmitting power for the second access technology;
  wherein: $PE_{MAX}$ is a maximum transmitting power configured by the base station for a current carrier;
  $P_{POWERCLASS}$ is a maximum transmitting power of a power class to which a user equipment belongs; and
  P-MPR is the power reduction value.

13. An apparatus for controlling transmitting power, comprising:
  non-transitory computer readable storage medium to store a program; and
  computer hardware configured, including configured by the program, to:

set in response to a first data transmission using a first access technology while performing a second data transmission using a second access technology, according to a transmitted data volume of the first data transmission using the first access technology, a power reduction value for transmitting power for the second data transmission using the second access technology by sampling of the data volume of the first data transmission using the first access technology; and control, according to the power reduction value, the transmitting power for the second data transmission using the second access technology, wherein the sampling of the data volume of the first data transmission using the first access technology is within a time period set through signaling from a base station.

14. The apparatus according to claim 13, wherein the signaling is according to a radio resource control (RRC) signaling .

15. The apparatus according to claim 13, wherein the computer hardware is further configured to:

determine the power reduction value according to information indicating mappings between respective data volumes and power reduction values.

* * * * *